US012690704B2

(12) United States Patent
Rau et al.

(10) Patent No.: US 12,690,704 B2
(45) Date of Patent: Jul. 28, 2026

(54) PAPERBOARD CONTAINER WITH SIDEWALL FEATURES AND METHOD OF MANUFACTURING THEREOF

(71) Applicant: Dart Container Corporation, Mason, MI (US)

(72) Inventors: Robert William Rau, Dewitt, MI (US); Yogesh Manilal Shah, Wheeling, IL (US)

(73) Assignee: Dart Container Corporation, Mason, MI (US)

( * ) Notice: Subject to any disclaimer, the term of this patent is extended or adjusted under 35 U.S.C. 154(b) by 0 days.

(21) Appl. No.: 18/625,531

(22) Filed: Apr. 3, 2024

(65) Prior Publication Data

US 2024/0324799 A1 Oct. 3, 2024

Related U.S. Application Data

(60) Provisional application No. 63/493,988, filed on Apr. 3, 2023.

(51) Int. Cl.

*A47G 19/03* (2006.01)
*B31B 50/59* (2017.01)
*B31B 110/20* (2017.01)
*B31B 120/70* (2017.01)

(52) U.S. Cl.

CPC ............ *A47G 19/03* (2013.01); *B31B 50/592* (2018.05); *B31B 2110/20* (2017.08); *B31B 2120/70* (2017.08)

(58) Field of Classification Search

CPC . A47G 19/03; B65D 1/34; B65D 1/42; B31B 50/592; B31B 2110/20; B31B 2120/70; B31B 2110/30; B31B 2120/002; B31D 5/02; B31D 5/0021

See application file for complete search history.

(56) References Cited

U.S. PATENT DOCUMENTS 5,050,791 A * 9/1991 Bowden .................. B65D 1/34 D9/425
5,088,640 A 2/1992 Littlejohn
5,326,020 A 7/1994 Cheshire et al.
5,938,112 A * 8/1999 Sandstrom ............. D21H 21/16 229/407
D445,303 S * 7/2001 Littlejohn ...................... D7/588
D445,304 S * 7/2001 Littlejohn ...................... D7/588

(Continued)

*Primary Examiner* — Don M Anderson

(74) *Attorney, Agent, or Firm* — Neal, Gerber & Eisenberg LLP

(57) ABSTRACT

A disposable paperboard container, and method for manufacturing the same, formed into a geometric shape having a bottom wall with a bottom transition segment about the periphery of the bottom wall leading to an upstanding sidewall extending to an upper rim, wherein an undulation of paperboard resides along the peripheral area of the lower portion of the sidewall to form a stepped lower sidewall, the stepped lower sidewall being joined to a smooth upper sidewall that extends upward tapered outward; wherein the stepped lower sidewall includes a first bend and a second bend of paperboard about the periphery of the lower sidewall and a transition segment between the first and second bend extends radially outward to form a rim about the peripheral area of the lower portion of the sidewall.

23 Claims, 9 Drawing Sheets

(56) References Cited

U.S. PATENT DOCUMENTS

| | | | | |
|---|---|---|---|---|
| 6,401,962 | B1 * | 6/2002 | Littlejohn | B65D 1/26 220/574 |
| 6,561,375 | B1 * | 5/2003 | Nagy | B65D 1/34 206/460 |
| 6,715,630 | B2 | 4/2004 | Littlejohn et al. | |
| 7,048,176 | B2 | 5/2006 | Littlejohn et al. | |
| 7,798,353 | B2 | 9/2010 | Blythe et al. | |
| 7,905,821 | B2 | 3/2011 | Stahlecker | |
| 8,387,857 | B2 | 3/2013 | Messerschmid | |
| 8,534,460 | B2 | 9/2013 | Middleton et al. | |
| 8,549,721 | B2 | 10/2013 | Vesanto et al. | |
| 8,561,823 | B1 | 10/2013 | Krupa | |
| 8,584,929 | B2 * | 11/2013 | Littlejohn | B65D 43/0212 220/574 |
| 8,651,279 | B2 | 2/2014 | Malone et al. | |
| 8,651,366 | B2 | 2/2014 | Littlejohn et al. | |
| 8,740,055 | B2 | 6/2014 | Stahlecker | |
| 8,741,443 | B2 | 6/2014 | Hilbish | |
| 8,875,986 | B2 | 11/2014 | Stahlecker | |
| 9,174,789 | B2 | 11/2015 | Netzer et al. | |
| 9,260,220 | B2 | 2/2016 | Messerschmid et al. | |
| 9,392,891 | B2 | 7/2016 | Littlejohn et al. | |
| 9,499,327 | B2 | 11/2016 | D'amato | |
| 9,538,870 | B2 | 1/2017 | Littlejohn et al. | |
| 9,539,786 | B2 | 1/2017 | Marshall | |
| 9,655,461 | B2 * | 5/2017 | Littlejohn | A47G 19/03 |
| 9,669,987 | B2 | 6/2017 | Stahlecker | |
| 9,718,601 | B2 | 8/2017 | Stahlecker et al. | |
| 9,808,117 | B2 * | 11/2017 | Wnek | A47J 36/027 |
| 10,077,134 | B2 | 9/2018 | Wnek et al. | |
| 10,099,840 | B2 | 10/2018 | Frost et al. | |
| RE47,165 | E * | 12/2018 | Littlejohn | B65D 1/34 |
| 11,254,466 | B2 | 2/2022 | Evans et al. | |
| 2005/0109653 | A1 * | 5/2005 | Wnek | B65D 1/34 206/515 |
| 2007/0138046 | A1 * | 6/2007 | Vovan | B65D 43/162 206/509 |
| 2009/0114659 | A1 * | 5/2009 | Littlejohn | B65D 1/34 220/660 |
| 2009/0173776 | A1 * | 7/2009 | Swoboda | A47G 19/03 229/407 |
| 2015/0041529 | A1 * | 2/2015 | Rasanen | B31B 50/44 229/407 |
| 2021/0127869 | A1 * | 5/2021 | Le | A47G 19/03 |
| 2021/0162649 | A1 * | 6/2021 | Lee | B65B 7/162 |
| 2021/0387773 | A1 | 12/2021 | Fan et al. | |
| 2022/0097924 | A1 | 3/2022 | Bontrager et al. | |

* cited by examiner

PAPERBOARD CONTAINER WITH SIDEWALL FEATURES AND METHOD OF MANUFACTURING THEREOF

CROSS-REFERENCE TO RELATED APPLICATIONS

This application claims the benefit of U.S. Provisional Application No. 63/493,988 filed on Apr. 3, 2023, which is incorporated by reference herein.

DESCRIPTION

Technical Field

The invention relates to pressed paperboard containers, such as disposable paper plates, having geometric features providing increased strength, rigidity and stack nesting, and the processes used to form such containers.

Background of the Invention

Pressed paperboard containers, such as paperboard plates, bowls and platters, are typically formed in a conversion process wherein a flat paperboard blank is drawn into a three-dimensional shape. This process is performed by placing the flat paperboard blank between two opposed conversion dies to draw the paperboard into the desired geometric shape, assisted by application of suitable heat and pressure, to form the container into the desired shape. Unlike non-paperboard disposable serving-ware containers, such as those constructed of thermoformed polymer, there are several challenging limitations associated with the process of forming containers from paper fibrous material. For example, because paperboard containers are formed of a thin flat blank of generally non-plastid material such as rigid paperboard sheet stock, pleats are formed in the paperboard during the drawing/conversion process when reducing the overall diameter of the product into the finished shape. In addition, because paperboard is constructed as a thin layer of elongated paper/cellulose fibers which cannot be forced to move or flow such as with thermoformed plastic containers, there are significant limitations when designing the desired geometric shape or features of the paperboard container, including limitations of the degree of curvature that may be formed.

Paperboard containers used for serving ware, such as disposable paper plates, are typically formed to a resulting outer circumference in the range of 6 to 11 inches, and most commonly offered commercially in sizes of approximately 7, 9 and 10 inches. Such paperboard containers are formed from a flat paperboard blank with a larger diameter, and drawn to form a bottom wall and an upturned sidewall that terminates at an upper rim. The resulting paperboard container have a geometric shape that may be described when viewed in cross section such as is shown in the Figures, with a bottom wall 2, an upturned sidewall 4 extending upward from the bottom wall 2, and rim 6 extending outwardly from the sidewall 4 which terminates as downturned lip 8 that extends downward from the rim 6 to the edge of the plate 1. Other similar conventional disposable paperboard containers have a rim 6 that is rounded rather than a flat rim, such as is shown in FIG. 1.

There are inherent limitations to the design of disposable containers that are formed of paperboard, and the process used to form the container. Specifically, because paperboard is a rigid material consisting of an arrangement of elongated cellulose fibers, the process of forming a paperboard container is very different from that of plastic containers. Paperboard material is generally not capable of "flowing" during the manufacturing process, such as may be achieved when manufacturing a plastic container. Therefore, the process of forming a paper plate is one in which a flat paperboard blank is mechanically forced into a die cavity to form a three-dimensional shape. To facilitate the process of forming the container shape, the paperboard is commonly pre-moistened to possess a desirable moisture content, and the dies used to force the paperboard into the desired shape are often heated. This combination of moisture and heat is considered useful for facilitating formation of the three-dimensional container from flat paperboard. However, there are practical limitations of the level of moisture content, and the level of heat, that may be utilized to prevent damage to the product. For example, disposable containers such as paper plates are often made of coated paperboard, with the final product having an upper coated surface that resists moisture. Excessive heat and moisture during the manufacturing process can result in the coating to be compromised, such as the coating developing cracks or becoming separated from the paperboard. In addition, regardless of the method of manufacture including a desired moisture content of the paperboard stock and use of heated dies applying the forming pressure, there are natural limitations to the geometric features of a finished paperboard container due to the lack of plasticity of the cellulose fibers of the paperboard. Unlike plastic containers, disposable containers made of paperboard or paper pulp, which are comprised of elongated cellulose (paper) fibers formed into a layer of a fibrous network. A container made of such a fibrous network material has relatively smooth curved transition portions that form the geometric shape, i.e., when viewed in cross-section, the fibrous material has curved segments in the transition between the bottom, sidewall and upper rim portion that are generally limited to less than 90 degree bend of the material with an inner radius less than approximately 0.050 inches.

As the paperboard is forced into a die cavity, the material must gather and form pleats. The pleats are formed around the periphery because the vertical draw constricts the diameter of the rim, creating excess material particularly in the area mid-way along the length of the sidewall and in the rim area. Therefore, the pleats are generally comprised of folded paperboard that gathers along a radial path in the outer region of the container, wherein at least an extent of the length of the pleat contains at least a double thickness of paperboard. These pleats detract from achieving a desired rigidity of the container such as a disposable paper plate, particularly when areas of the container are subject to stress and strain due to a downward force due to the weight of food during use. Pleats formed during the manufacturing process include areas in which the fibrous structure of paperboard is subject to at least some degree of delamination of the fibrous network, resulting in weakened areas of the paperboard. In addition, the pleats may separate when a tensile stress is applied on the container, resulting in pleated area being subject to separating force.

Conventional paperboard containers, such as paper plates and bowls, generally have either randomly-formed pleats or a pre-scored pleat arrangement. A pre-scored pleat arrangement is achieved by "scoring" the paperboard blank with a scoring knife prior to converting the container into its drawn shape. This scoring operation weakens the material by damaging the laminar structure of the paperboard, which induces the paper to fold at the scored areas when the paperboard is pressed into a plate. Paperboard containers, such as disposable plates and bowls, are formed from a circular blank that is cut from paperboard sheet stock. The scorelines of the blank are commonly formed in the operation of cutting the blank from the sheet. This is done by including mating core die surfaces in the opposed blanking die. The pre-scored pleat arrangement is formed into the blank as a plurality of generally equally-spaced radial scorelines extending radially outward along the outer portion of the container. Alternative arrangements of pre-scored pleats may also be employed to avoid having radial lines of weakness, such as is disclosed in U.S. Pat. No. 9,555,916.

In the past, certain variations have been made to the geometry of paperboard containers in attempt to increase the rigidity of a finished containers. For example, attempts have been made to use differing radius of curvature at the transition between the sidewall and the rim, or by altering the angle of the sidewall, or by including a generally horizontal "evert" portion of paperboard extending radially outward from the outer lip, such as is shown in FIG. 6. Examples of such types of geometric features are disclosed in prior patents such as U.S. Pat. Nos. 5,088,640, 8,177,119, and 8,584,929. Notably, each such variation utilize a "smooth" sidewall extending between the bottom wall and the rim, which has been generally accepted as a standard feature when forming a disposable paperboard container, such as a disposable paper plate or platter or a bowl.

Therefore, while various changes to geometric features of a paperboard container have been explored, including changes intended to provide enhanced rigidity or stiffness over conventional designs, such developments have not included a departure from conventional geometry of the sidewall being a continuous "smooth" segment of paperboard extending between the plate bottom and the upper rim, which is the area of pleat gathering and re-bonding. Instead, the focus of prior efforts for improving the rigidity of paperboard containers has been by altering the geometric shape in outer areas of the container such as the upper radius, the rim and the outer lip area. However, these attempts for increased rigidity provide limited benefit, particularly as the outer region of the paper plate (i.e., the rim and outer lip area) has limited ability to resist or redirect stress on the plate when a load or downward force is applied on the plate.

The present invention provides a dramatically different approach for increased rigidity for containers manufactured from a layer of cellulose fibrous material such as a plate made of paperboard sheet stock, by including a geometrical component located in the lower portion of the sidewall, such as an annular ring structure of the paperboard that is formed as a plurality of bends to create a rim located within a lower portion of sidewall. This structural feature, which is formed as an undulation of the paperboard as a "stepped" configuration of the lower portion of the sidewall, below a generally smooth tapered upper portion of the sidewall, has been found to provide enhance rigidity of the container by resisting the stress and strain experienced on the container when weight is applied, such as food placed on the container when in use. Accordingly, the present invention is provided to solve the problems discussed above and other problems, and to provide advantages which are achieved with acceptable ranges of manufacturing parameters such as the moisture level of the paperboard, the amount of heat applied during the process, and the time necessary for forming the container. A full discussion of the features and advantages of the present invention is deferred to the following detailed description, which proceeds with reference to the accompanying drawings.

SUMMARY OF THE INVENTION

The present invention provides a disposable paper container formed from a layer of cellulose fibrous materials having a geometric shape with a bottom wall, a sidewall extending upward from the bottom wall and terminating at an upper rim extending outward, wherein the sidewall includes a ring structure formed from a plurality of bends in the lower portion of the sidewall. According to an embodiment, the sidewall ring structure is formed along the entire circumferential area of the sidewall, within the lower portion of the sidewall. In another embodiment, the sidewall ring structure resides intermittently about the circumferential area of the lower sidewall, preferably along a majority of the circumferential area, such as being formed along the straight portions of a square or rectangular container, or a similar container that has an outer shape comprised of straight segments and curved corner segments. The sidewall ring structure is formed of an undulation of the paperboard in the lower portion of the sidewall, having a generally S-shaped geometry when viewed in cross section, comprised of a first (lower) bend of paperboard forming a first curved segment with a convex upper surface and wherein the paperboard is directed upward and radially outward. The first curved segment leads to a generally flat transition segment of paperboard extending radially outwardly, forming a substantially horizontal rim within the lower sidewall. A second (upper) bend of the paperboard forms a second curved portion having a concave upper surface that directs the paperboard radially upward from the transition segment, toward a smooth and outwardly tapered upper portion of the sidewall. In an embodiment, the sidewall ring structure formed from a plurality of bends of the fibrous material results in an outwardly extending rim in the lower portion of the sidewall which is joined to a tapered upper portion of the sidewall that leads to the upper rim of the container.

The present invention also provides a method of manufacturing a paperboard container using a paperboard blank and a set of forming dies. The method includes pressing the blank between forming dies, wherein the forming dies have mating surfaces of projections and receivers (recesses) about the periphery of the forming dies in the area of the dies used to form the sidewall of the container. The method includes the step of forcing the dies together so the projections and receivers are in mating alignment to form an annular ring structure in the lower portion of the sidewall of the container. The mating projections and receivers are forced together to form a plurality of bends of the fibrous paper material, thereby forming an undulation of the paperboard within the circumferential area of the lower portion of the sidewall. In an embodiment of the method, an undulation of paperboard is formed having a generally S-shaped configuration when viewed in cross-section, comprised of a first curved segment having a convex upper surface, a radially extending transition segment, and a second curved segment having a concave upper surface, which then extends to a upper portion of the sidewall that tapers upward and radially outward.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
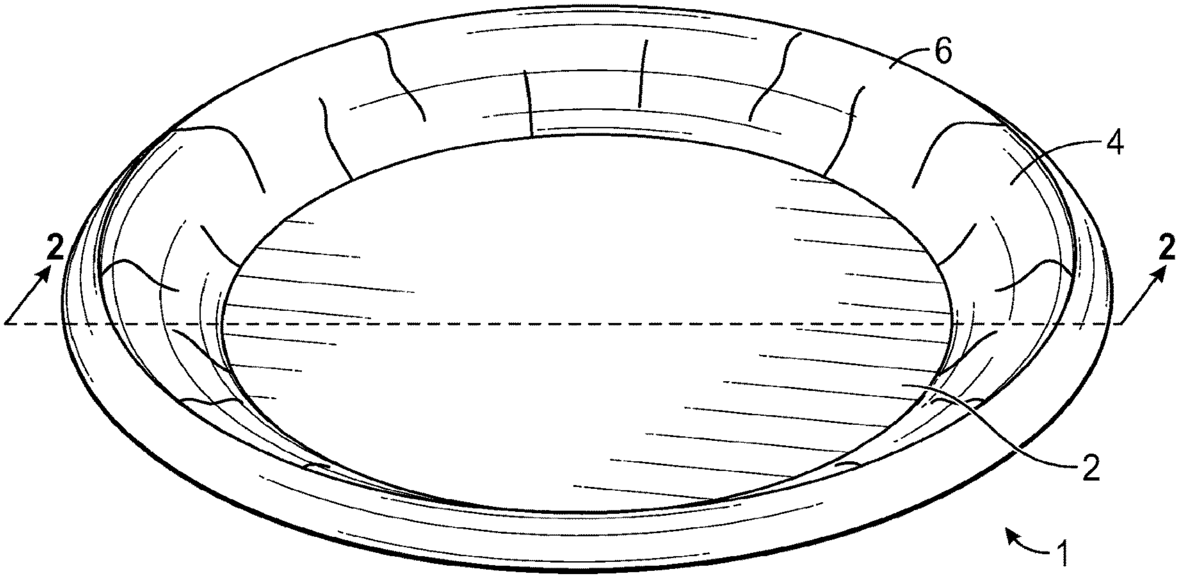
FIG. 1 shows a conventional disposable paperboard container with a bottom, an upwardly directed sidewall and a rounded upper rim.
Figure 2:
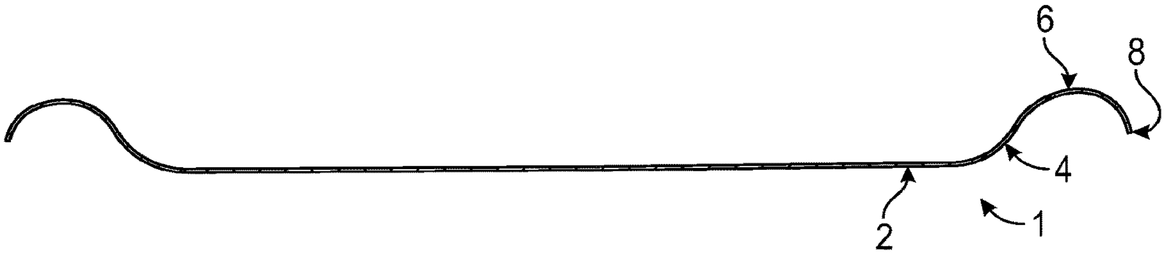
FIG. 2 depicts a cross-sectional view of the container shown in FIG. 1, taken along sectional line 2-2.
Figure 3:
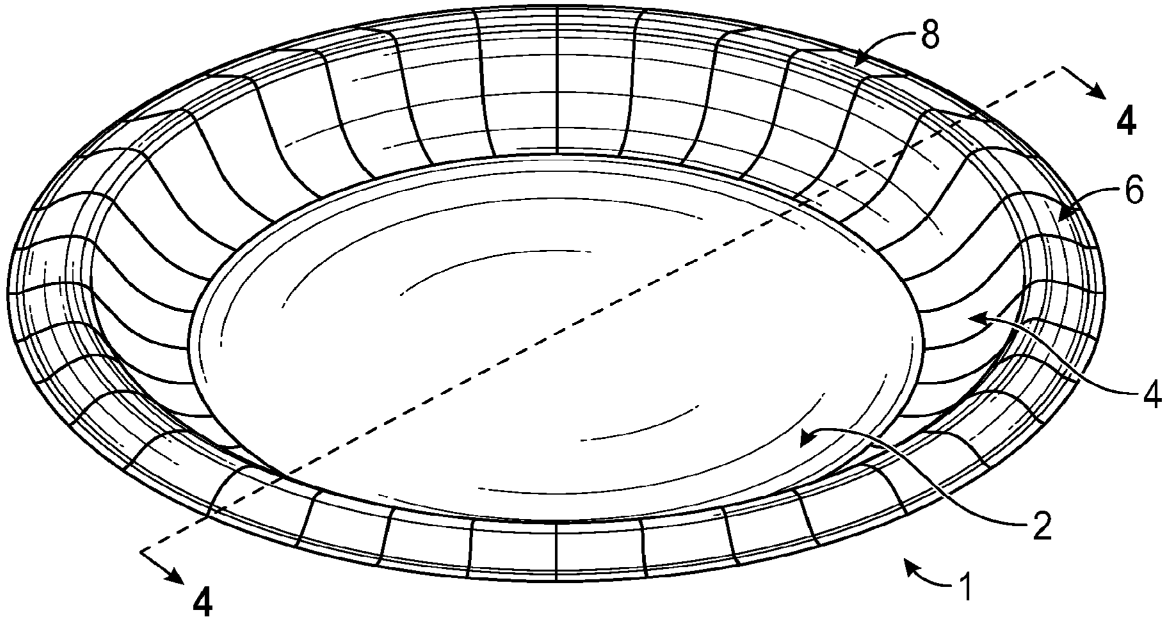
FIG. 3 shows a conventional disposable paperboard container with a bottom, an upwardly directed sidewall and a generally flat upper rim with a downturned lip.
Figure 4:
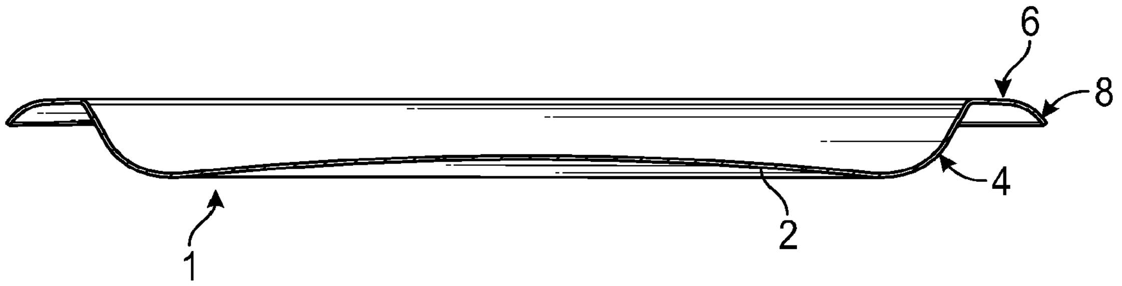
FIG. 4 depicts a cross-sectional view of the container shown in FIG. 3, taken along sectional line 4-4.
Figure 5:
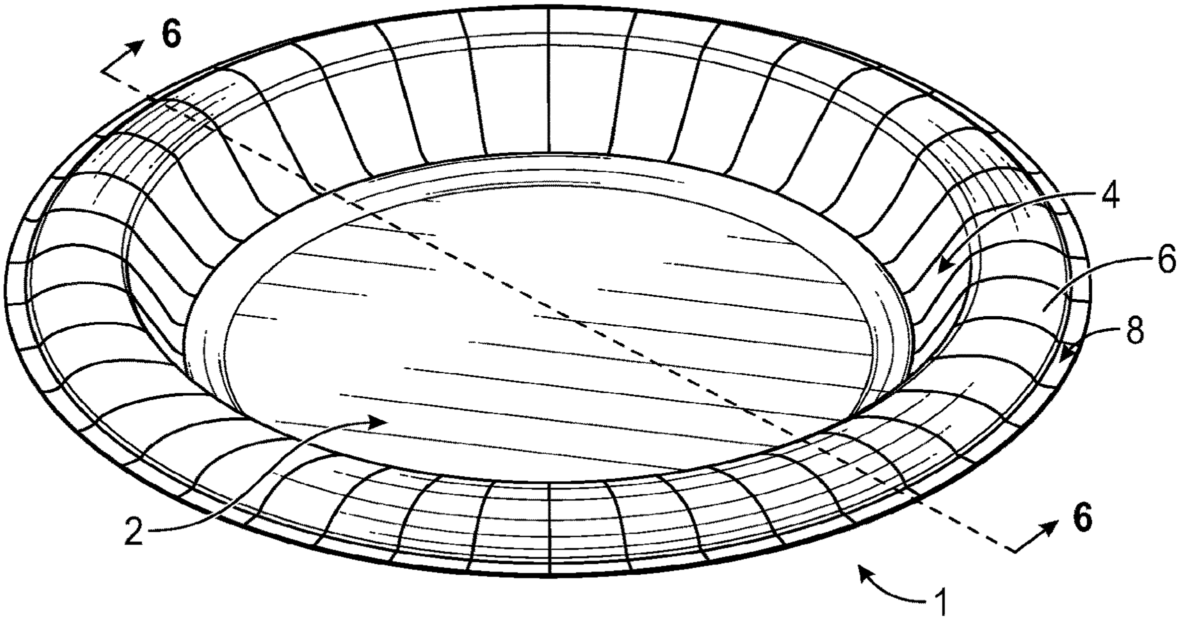
FIG. 5 shows a conventional disposable paperboard container with a bottom, an upwardly directed sidewall and a rounded upper rim with a generally horizontal extending lip, or evert portion.
Figure 6:
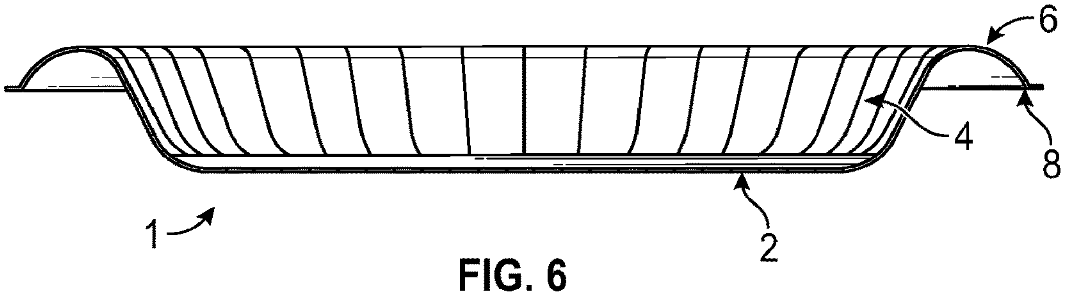
FIG. 6 depicts a cross-sectional view of the container shown in FIG. 5, taken along sectional line 6-6.
Figure 7:
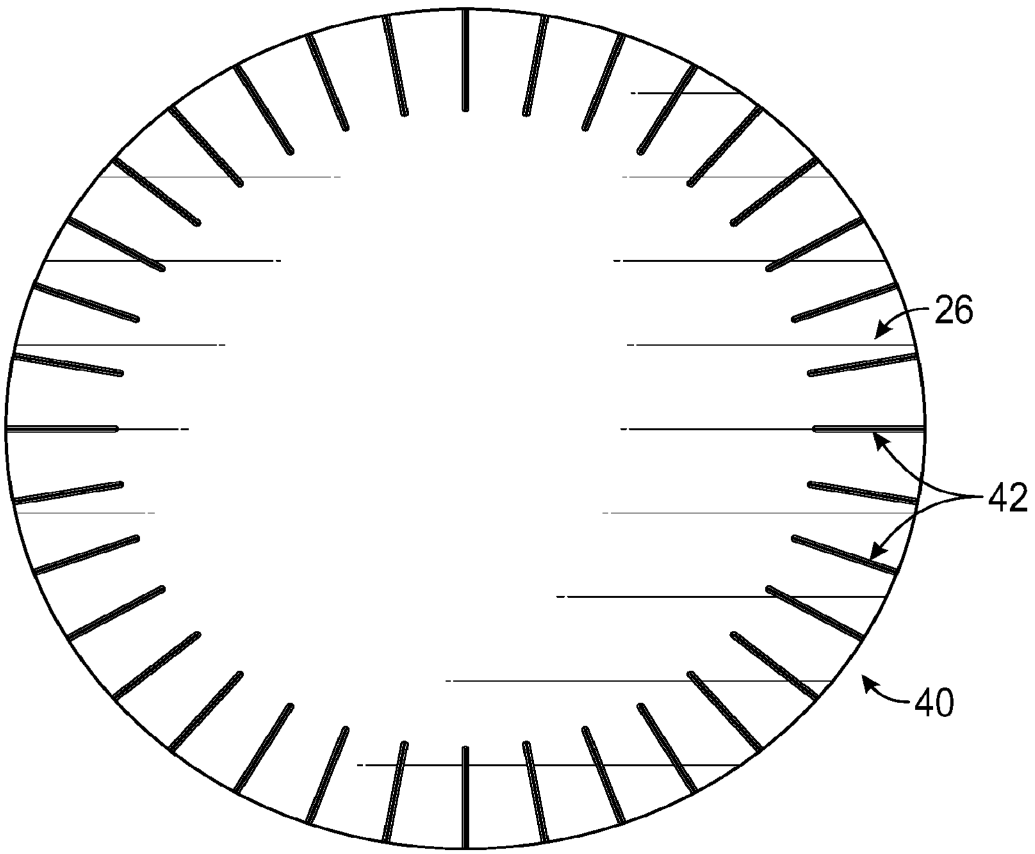
FIG. 7 Shows a paperboard blank used to manufacture a disposable paperboard container such as a disposable paper plate, the blank being a flat segment of paperboard with a generally round outer circumference and a plurality of scorelines formed into the paperboard which extend radially outward along the outer area of the blank which is the area comprising the sidewall and rim of the formed container.

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention provides a novel structure, and related method of manufacture, for a paperboard container such as a disposable paper plate having a circumferential undulation 30 of the paperboard formed about the peripheral area of the sidewall located in the lower portion of the sidewall. In an embodiment, the undulation of paperboard 30 is comprised of a plurality of bends or folds in the paperboard material that are separated by a radially extending transition segment 32. The folds formed within the sidewall are comprised of at least two bends of the paperboard in the lower sidewall, resulting in an undulating crease in the lower portion of the sidewall of the container. One of the bends of paperboard preferably has a convex upper surface and the other bend of paperboard preferably has a concave upper surface. The outwardly extending transition segment between the first and second bends of paperboard to form an undulating sidewall rim structure 30 positioned in the lower portion of the sidewall. In the upper portion of the sidewall, which is the primary area of pleat formation, the paperboard is preferably smooth, and tapers radially outward toward the upper rim of the container. Incorporating the structural component of opposing bends (32, 36) and outwardly extending rim 34 in the lower portion of the sidewall provides enhanced rigidity of the container to resist downward pressure when the container is used, such as when the weight of food is placed on the container, while minimizing disruption to the pleats that are formed in the sidewall.

The invention disclosed is primarily used in connection with pressed paperboard containers, commonly a product referenced as disposable paper plates. However, other paperboard container product designs can benefit from the present invention, including disposable paperboard platters, bowls, or non-round disposable containers such as square, rectangular, or other shapes of containers with elongated (linear or curvilinear) sides joined by corners. Accordingly, the container designs shown and described herein are disclosed by way of example only, and the present invention is applicable to a range of disposable paperboard containers and not limited to the generally round container products such shown in the Figures.

A paperboard container 10 incorporating an embodiment of present invention is shown in FIGS. 8-11. The general structural components of the paperboard container 10, here shown as a round disposable paper plate, share some structural components (i.e., geometric features) of common disposable paper plates such as shown in FIGS. 1-7. Specifically, paperboard containers such as disposable paper plates generally include a bottom wall 12, a bottom radius 14 defining the outer border of the bottom wall and leading to a smooth outwardly tapered sidewall 16 extending radially outward and upward from the bottom radius toward an upper radius 18, and a rim 20 that extends outward from the upper radius 18. Further, such containers commonly have a downturned lip 22 that extends downward from the rim 20 to the edge of the plate 10, and alternatively may include an outwardly extending portion, or evert. Modifications to this geometry may be made while still practicing the present invention. For example, the upper rim 20 and downturned lip 22 may differ, such as having a rounded rim 20 rather than a generally flat upper rim 20. Alternatively, the rim 20 may be formed as a generally flat area with a down-turned angle, i.e., a rim 20 that is not horizontal and instead is directed downward at an angle from the outer radius 18. Such paperboard containers also commonly have a plurality of pleats 24 located around the peripheral area 26 of the plate 10, beginning in an area of the sidewall 16 and extending outwardly through the rim 18 and the lip 20 to the edge 22 of the plate 10.

The present invention is useful for providing a paperboard container, such as those having common geometric features described above, with increased rigidity. Paperboard containers are often used for food preparation, food packing, and food service, which are subject to the force of gravity of food placed on the container. For example, a typical disposable paper plate may be loaded with more than 10 ounces of food items by a user, is then held by one hand as it is carried or used. The downward force of such a load on the plate causes stresses on the paperboard. Therefore, it is desirable for the paper plate to have a suitable degree of rigidity or stiffness, particularly as it is also desirable to utilize paperboard that has reduced thickness for cost savings. Plate rigidity can be altered through a number of factors, including the geometry of the plate, thickness of the paper stock, and coatings and process parameters that enhance inseparability of the pleats. However, due to practical constraints associated with the manufacturing process and the difficulty of forming a three dimensional shape of paperboard sheet stock, there are few options for enhancing rigidity without resorting to use of a ticker paperboard.

Certain tests have been devised in the industry to assess the rigidity of a paperboard containers, with particular focus on rigidity of paper plates. One such test is the "FPI" test (Food Packaging Institute test, or that which is formerly known as the Single Serving Institute, or "SSI" test). This test measures the force (by grams of weight) required to deflect one side of the plate (at the rim portion that is opposite the area of the user's thumb on top of the rim) to a measure of ½ inch deflection (i.e., grams per 0.5 inch deflection of the plate). Another measure of plate rigidity may be observed by applying a force on the plate rim and determining whether the plate buckles, or steadily increasing deflection to observe the amount required for the plate to fail or buckle. Bucking usually occurs due to a crease forming along the bottom wall and opposed portions of the sidewall, typically along with separation of pleats in the rim or sidewall area.

Figure 10:
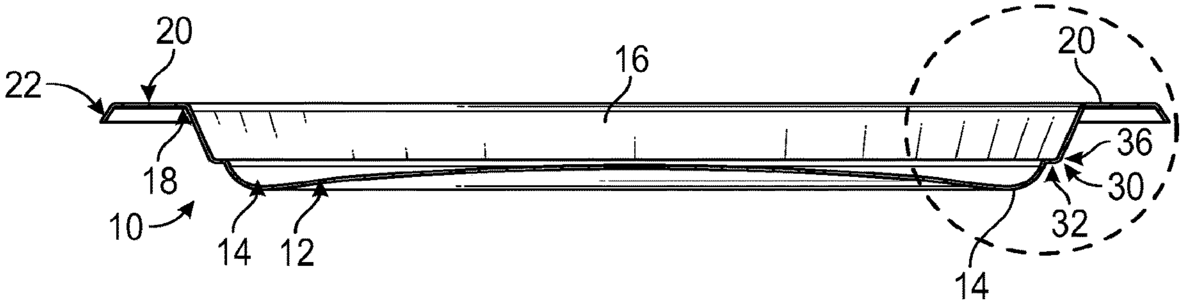
FIG. 10 is a cross-sectional view of a container shown in FIG. 8, taken along lines 10-10 of FIG. 9.
Figure 11:
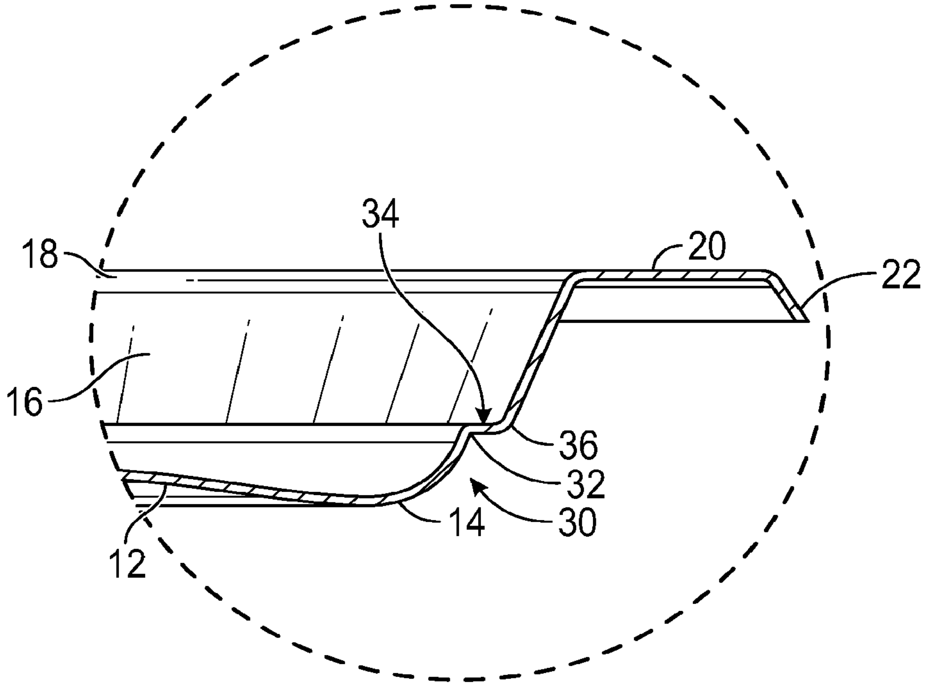
FIG. 11 is a detailed cross-sectional view of the container shown in FIG. 8, depicting a magnified portion of the cross-section shown in FIG. 10.

The inventors have discovered that rigidity of a paperboard container may be enhanced by incorporating an annular ring 30 formed by creating an undulation of paperboard in the lower portion of the sidewall 16 to form an annular rim 34 (or "sidewall rim"). The undulations, such as may be formed as concentric rings of folds in the paperboard within the lower portion of the sidewall 16, results in a stepped configuration of the sidewall 16—thus forming a stepped sidewall whereby a region of the lower sidewall is not smooth, and instead has a stepped shape 30 when viewed in cross section, as shown in FIGS. 10 and 11. This feature is incorporated into the lower potion of the sidewall 16, which is generally defined as the lower half of the sidewall height (the vertical span of the sidewall as measured along a vertical axis, from the bottom transition segment to the upper rim of the container), extending radially outward and upward from the bottom transition segment joining the sidewall to the bottom wall.

Figure 8:
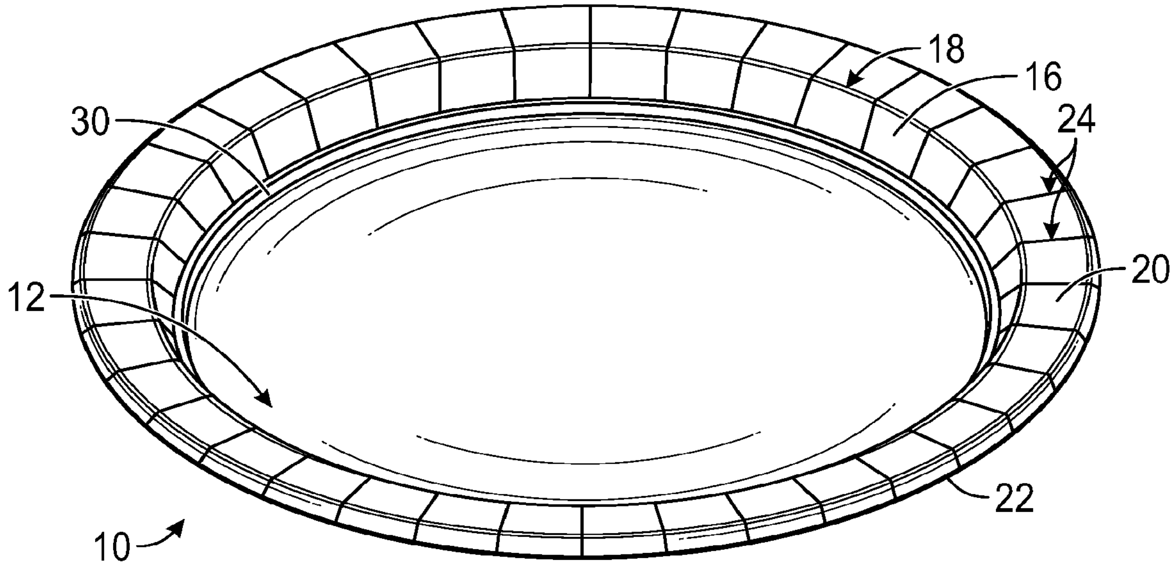
FIG. 8 is an elevated perspective view of a disposable paperboard container in accordance with the present invention.
Figure 9:
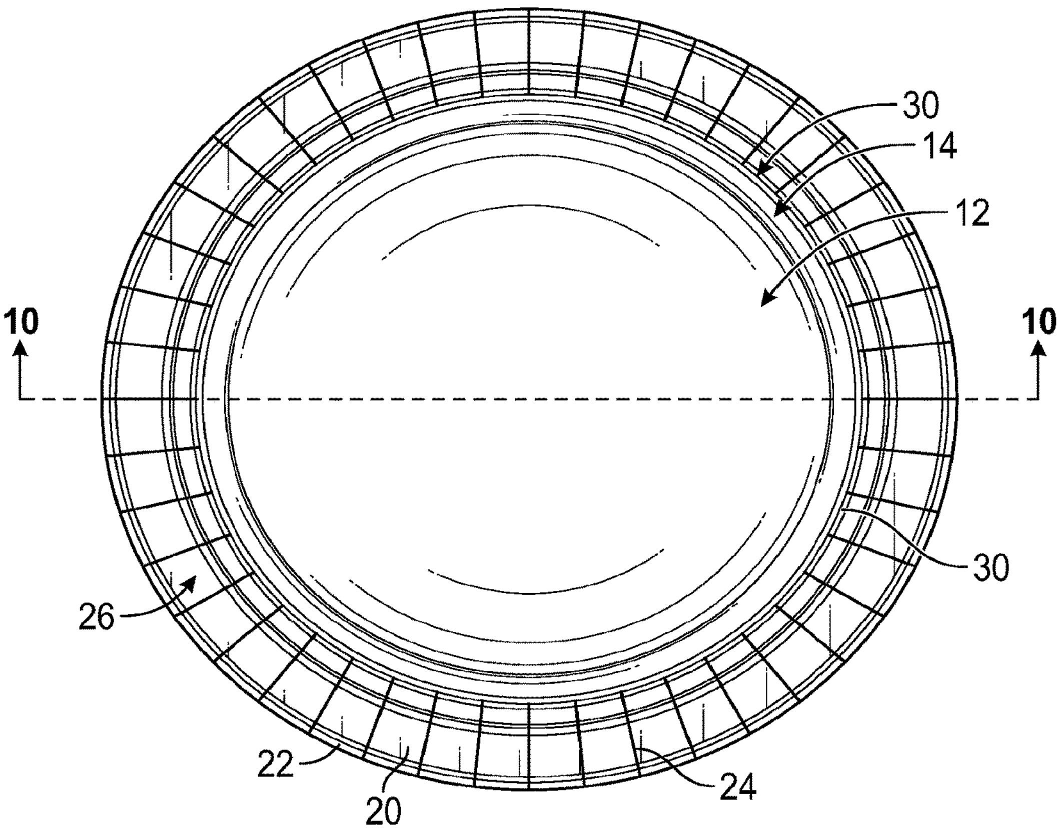
FIG. 9 is a plan view of the paperboard container shown in FIG. 8.

In the embodiments shown in the Figures, the stepped sidewall structure 30 and resulting sidewall rim 34 are formed as continuous annular components about the entire circumferential area of sidewall of a paperboard container 10, such the container show which is commonly referred to as a disposable paper plate. For example, as shown in FIGS. 8-9, concentric folds or bends of paperboard (32, 36) separated by an annular rim 34 is formed in the lower portion of the sidewall 16 of a round paper plate, immediately adjacent and above the bottom radius 14 at joining the sidewall 16 to the bottom wall 12. The sidewall undulation 30 resulting in a stepped portion of the sidewall 16 includes: (a) a first (lower) bend of paperboard 32 located adjacent the outer edge of the bottom wall 12, (b) connected to a generally horizontal transition segment 34 that extends radially outward, connected to (c) a second (upper) bend of paperboard 36 that leads to an upper portion of the sidewall 16 that extends upward and radially outward in a tapered configuration toward the rim 20.

In an embodiment, the undulated paperboard forming the stepped sidewall arrangement 30 has a lower bend 32 of paperboard that extends radially outward to a generally flat transition segment 36 which has an outward radial span in the range of about 0.02 inches to about 0.08 inches, and preferably approximately 0.04 inches. The second bend 36 extends upwardly from the transition segment 34 to direct the paperboard upwardly to join with a tapered smooth configuration of the upper sidewall. The combination of bends located in the lower portion of the sidewall provides an overall conical shape of the lower sidewall with an increasing sidewall diameter that approaches a widened start (bottom) of a smooth tapered upper sidewall.

The present invention also provides a method of forming paperboard containers, such as paper plates, platters or bowls, having increased strength and rigidity as compared to prior art containers. Generally, the method includes forming a paperboard container 10 having a rim 30 formed into the lower region of the sidewall 16. Paperboard stock used for the manufacture of such a container is generally available in a continuous roll. Preferably, paperboard for plate manufacture is moistened to a level in the range of about 6% to about 10%, to provide a suitable moisture content for forming a three-dimensional shape from the paperboard blank, as is a common practice in the industry. The top side of the paperboard is preferably treated with a coating that provides a desired degree of resistance from oil and moisture penetration on the top surface of the finished container.

The paperboard stock is formed into a paperboard blank 40 of a desired shape and size, and with scores 42 extending outwardly along the outer peripheral area of the blank 40. The region of the blank in which the scores 42 are formed is preferably confined to the areas of the blank 40 that will be formed into the sidewall 16, rim 20 and outer lip 22 of the finished container 10. For example, for the manufacture of circular disposable paper plates, the paperboard is cut into a suitable circular shape with a blank diameter. A plurality of score lines 42 are pressed into the blank 40 with a scoring knife to create scores in the desired locations along outer peripheral region of the blank 40. In one embodiment, the scores of the blank 40 has generally equally spaced lines 42 formed into the paperboard which extend radially outward. In alternative embodiments (not shown), the scores of the blank comprise a plurality of non-linear lines formed into the paperboard and/or the scores comprise lines formed into the paperboard that extend outwardly in a non-radial formation (i.e., not aligned along the radial axis of the blank). Further, variations of the score arrangement or alignment may be made to optimize pleat gathering for a particular shape or depth of the container formed. For example, a variation of pleat formation may be desirable when forming a square or rectangular plate or platter, such as by varying the position and frequency of the scorelines and pleats in the area of the rounded corners relative that join the generally straight sides of the container outer peripheral shape. Similarly, the undulation of paperboard in the sidewall in accordance with the present invention may be formed in the sidewall along the generally straight sides and minimized at (or absent from) the sidewall along the rounded corner areas of a square or rectangular the container.

In a preferred embodiment, the score lines 42 of the blank 40 are located in the areas of paperboard that, when the blank is pressed between manufacturing dies, form at least an upper portion of the sidewall, as well as the rim and any remaining outer area of the container. Specifically, the scored blank 40 is pressed between two mating forming dies 50, an upper die set 52 and a lower die set 54 (FIGS. 12, 13) to form the three-dimensional shape of the container 10 from the flat blank 40. This process naturally results in a paperboard container 10 with an outer diameter that is less than the outer diameter of the blank 40. Unlike with plastic molded disposable containers in which the material used to form the container is capable of melting or flowing into a molded shape, paperboard must be forced to gather (or fold upon itself) to allow for such a reduction in diameter to form the geometric shape of the container. This gathering or folding of paperboard results in pleats 24 being formed, which are areas of the paperboard with a greater amount of paperboard fibers, with portions of the pleat 24 comprising two or three layers of paperboard compiled together. As the mating forming dies are forced together, the paperboard along the pleats 24 are subject to heat and pressure to reduce the thickness of the gathered paperboard, ideally to a thickness generally equal to or approximate to the thickness of adjacent areas, and resulting in pleats that are at generally inseparable.

Densification of the paperboard along at least an extent of the length of the pleat 24 may be achieved due to the scores in the paperboard having resulted in a degree of delamination of the paperboard structure. Thus, heat and pressure during the conversion process may be used to compact the delaminated fibrous structure of the scored paperboard to cause densification of the fibers. However, the process of forming a container of paperboard, which naturally requires pleats, will invariably result in vulnerable weakness of the container due to the possibility of pleat separation, pleat cracking due to densification, or because the pleat results in a natural hinge line for the container to buckle when subject to a downward force. For example, when a paperboard container such as a disposable paper plate is used by a consumer, the weight of the food is a load exerting a downward force on an area of the plate, which results in a degree of deflection of the region of the plate, and areas of the plate are subject to stress and strain. The pleat formed in the upper area of the sidewall 16 and the rim 20 are particularly vulnerable to such forces, which may cause a pleat to separate and/or to serve as a hinge for the plate to buckle. Because pleat formation is particularly necessary in the upper sidewall and remaining peripheral area of the plate where a user typically will hold the plate, such areas of the plate are particularly vulnerable to such stress or strain.

Figure 12:
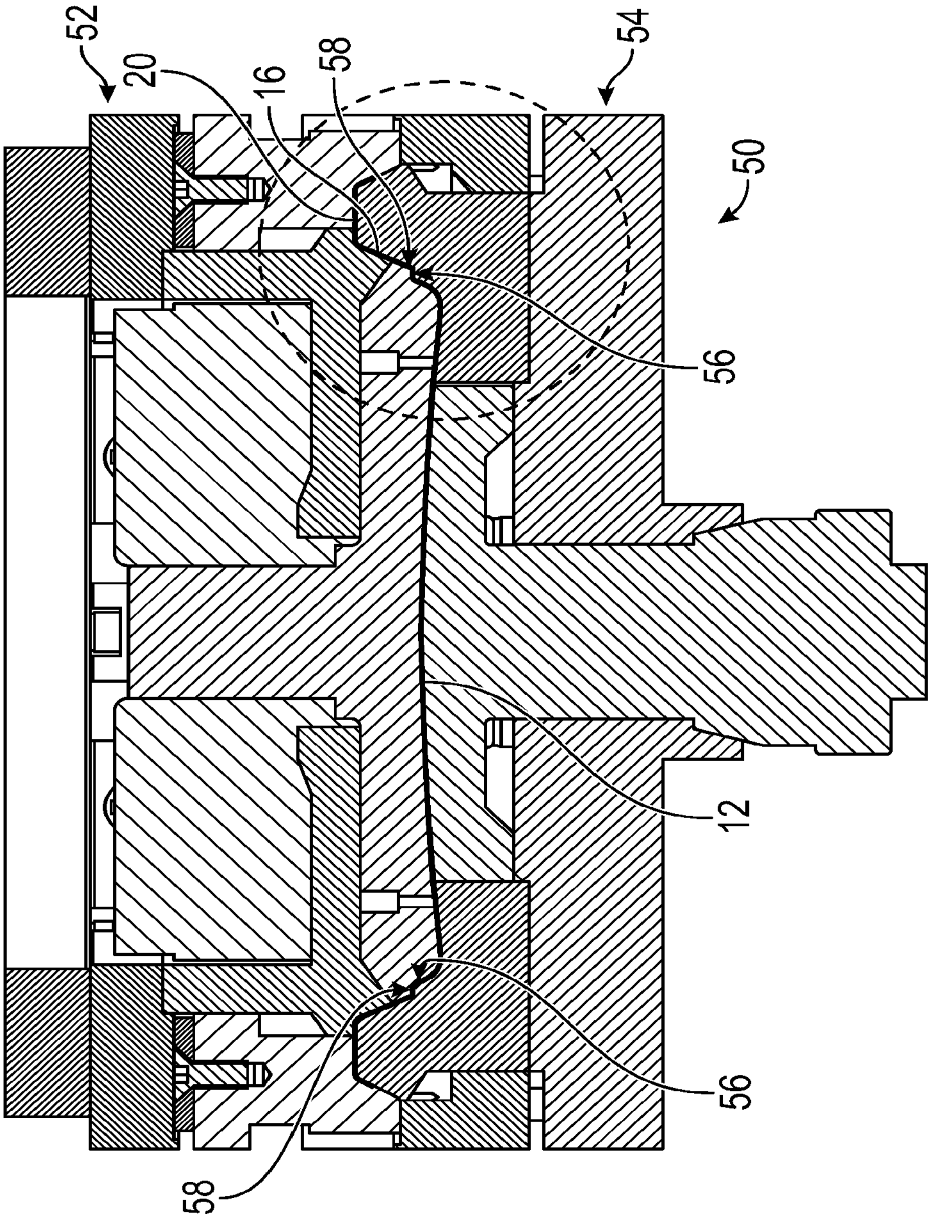
FIG. 12 is a cross-sectional view of manufacturing dies used to form the container shown in FIG. 8, showing mating upper and lower dies with the paperboard container being formed between the mating dies.
Figure 13:
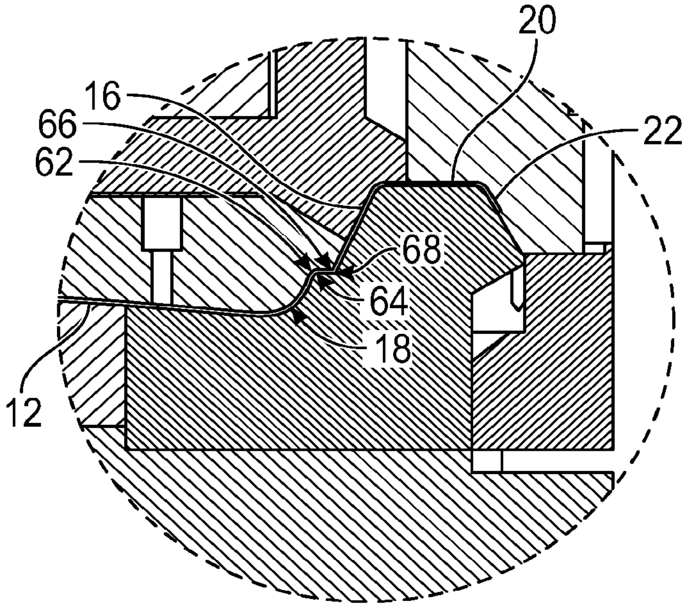
FIG. 13 is a detailed cross-sectional view of the manufacturing dies shown in FIG. 12.
Figure 14:
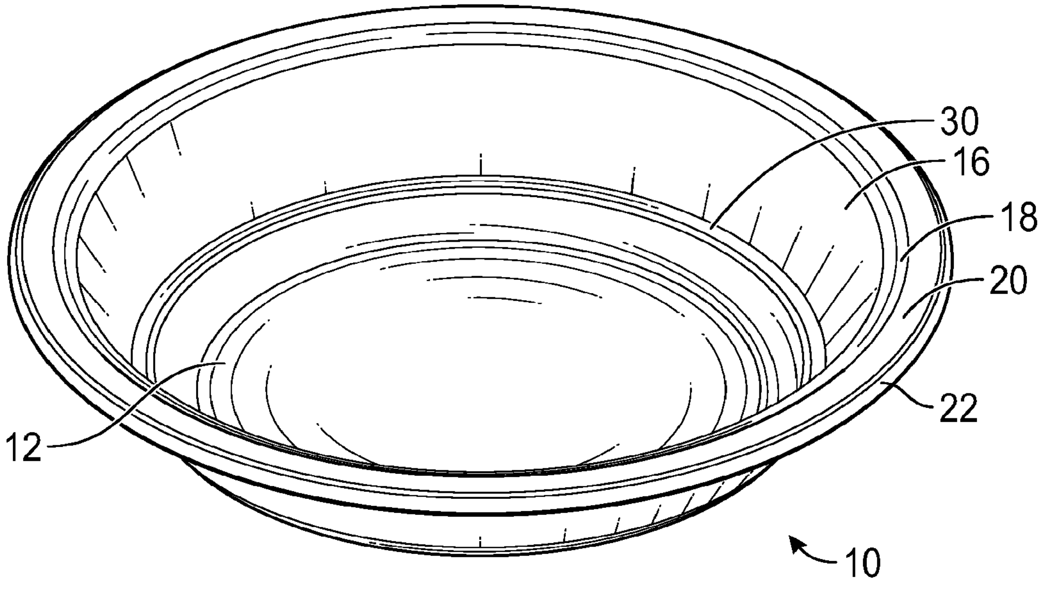
FIG. 14 is an elevated perspective view of a deep paperboard container, such as a disposable paper bowl, in accordance with the present invention; and, FIG. 15 is detailed cross-section view of the outer portion of the container shown in FIG. 14.
Figure 15:
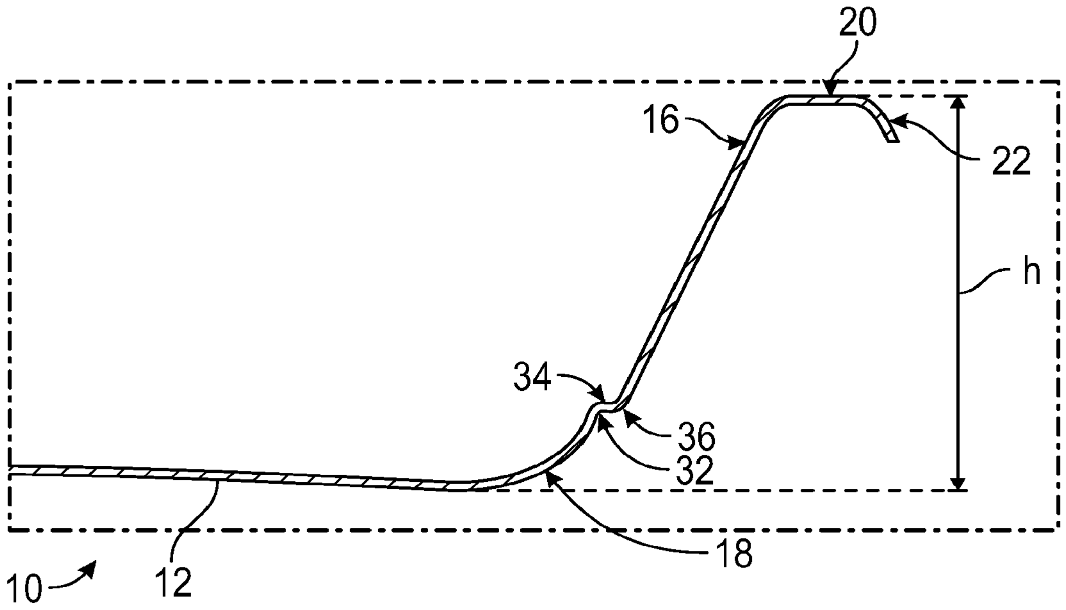

The present invention addresses this vulnerability of containers manufactured from paperboard by providing a process for forming a circumferential undulation of paperboard 30 which includes an outwardly extending transition segment 34 located in the lower region of the sidewall 16, preferably closely adjacent and above the bottom radius 14 of the container 10. In an embodiment, the manufacturing process for forming the undulated paperboard 30 is incorporated into the container conversion process, i.e., the undulation of paperboard 30 is formed at the same time that the paperboard blank is converted into the shape of a container by pressure applied between opposed sets of forming dies 50 (FIGS. 12 and 13). Accordingly, in a preferred form of the invention, the process for manufacturing the paperboard container includes providing opposed manufacturing die sets 50, as upper 52 and lower 54 dies, includes mating circumferential projections 56 and receivers (or recesses) 58 in the opposing dies to form an undulation of paperboard in the lower sidewall.

In the embodiment shown in the figures (FIGS. 12 and 13), a circumferential recess 62 (or receiver) is formed in the upper forming die 52, the recess 62 preferably being located a short distance above the outer radius of the die that forms the bottom radius 14 that joins the bottom wall 12 of the container to the sidewall 16. This location is preferrable for forming the sidewall undulating paperboard, which creates a stepped sidewall structure, 30 in the lower portion of the sidewall 16 of the container, where pleat formation resulting from the conversion process is minimal (i.e., paperboard gathering is minimal when converting the blank to a three dimensional container). The opposing (lower) forming die 54 includes a circumferential projection 64, located and dimensioned such that the projection 64 and recess 62 are aligned and have substantially mating dimensions when the dies 50 are forced together. When brought together during the forming process, the mating arrangement of a projection and aligned recess forms a lower bend of paperboard 32 in the sidewall 16 of the paperboard container 10, essentially forcing the paperboard to form a convex inner surface to direct the paperboard radially outward toward a transition segment 34. Similarly, a circumferential projection 66 on the upper die and substantially mating recess 68 on the lower die 54 are used to form a second (upper) bend 36 of the paperboard in the sidewall 16 of the container 10, which results in the paperboard forming a bend with a convex inner surface so the paperboard is directed radially upwardly and outwardly toward the upper portion of the sidewall 16. In this process, the opposed dies 50 are brought together, as shown in the arrangement in FIG. 12, with a force such that the space (i.e., the clearance) between the dies (52, 54) in the sidewall area 16 is the same or slightly greater than the thickness of the paperboard. For example, in the embodiment shown, the paperboard has a thickness of approximately 0.016 inch, and the clearance between the opposing dies in the sidewall area of the container being formed is generally in the range of the paper thickness or slightly greater, depending on factors such as stock thickness, moisture content of the paperboard and other process parameters, as would be readily understood by person in the art of making paperboard disposable containers such as paper plates.

In an embodiment of the invention, a suitable force is applied to bring the mating dies (52, 54) together to form the container 10, and at least one of the mating dies 50 is preferably heated to facilitate forming of the container. These techniques are commonly used when manufacturing paperboard containers such as a disposable paper plate. The process of the present invention may utilize parameters of heat and die pressure that are commonly used in the industry. Therefore, one benefit of the present invention is that the additional benefits of a sidewall rim 34 formed in the container may be achieved, without the need for greater die pressure of higher heat, thus minimizing complexity or potential damage to the products during manufacture. Further, the method of the present invention provides a process for forming an undulated sidewall structure 30 to form a sidewall rim 34 within the lower sidewall, without the need for an additional manufacturing step or unusual process parameter, because the method of forming a stepped lower sidewall may be readily incorporated into existing manufacturing lines by incorporating the features described above in the mating dies 50 used in converting a paperboard blank into a container. In addition, in an embodiment of the method disclosed, the undulating bends of paperboard 30 is formed in the lower portion of sidewall 16 of the container where there is minimal if any pleat formation. And the upper portion of the sidewall 16, an area requiring a greater amount of paperboard gathering and pleat formation, remains as a smooth sidewall area having a tapered configuration as the paperboard in the upper sidewall extends upward and radially outward toward the upper rim of the container.

As show in the disposable paper plate embodiment in the Figures, the first sidewall bend 32 (the lower bend formed as an outwardly directed bend of paperboard with a convex upper radius) is located in a bottom segment of the sidewall that is immediately adjacent the bottom radius 14 of the paper plate 10. As shown in FIG. 10 and FIG. 11, the first sidewall bend 32 is positioned immediately adjacent the bottom radius 14 to direct the paperboard radially outward from the bottom radius 14. Further as shown, the second sidewall bend 36 (the upper bend formed as an upwardly directed bend of paperboard with a concave upper radius) resides above the first bend 32, and the transition area 34 extends radially outward in a generally horizontal direction (i.e., extending along a horizontal plane generally parallel to the orientation of the bottom wall). Utilizing this method, an undulated shape of paperboard is formed in the lower sidewall which results in a sidewall rim 34 positioned within the lower half of the sidewall 16. For example, in an embodiment in which a paper plate has an average outer diameter ("characteristic diameter") approximately 8.5 inches, and an overall height (bottom to the top of the rim) of approximately 0.75 inches, the sidewall rim 34 is preferably located in the lower ⅓ of the sidewall height (i.e., the vertical distance between the bottom of the container and the upper rim). In this embodiment, the generally horizontal segment 34 of the sidewall rim is located approximately 0.5 inches from the upper rim of the container. Similarly, in an embodiment in which a paper plate has a characteristic diameter of approximately 10.0 inches and an overall height of approximately 0.95 inches, the horizontal segment of the sidewall rim 34 is located approximately 0.7 inches from the upper rim of the container.

Forming s stepped sidewall from an annular undulation 30 of paperboard in the sidewall in accordance with the present disclosure provides enhanced rigidity of the container, with increased ability to withstand stress and strain caused by the force exerted on the container 10 due to a load placed in the top surface of the bottom wall. Such enhanced rigidity as compared with conventional paperboard containers is achieved by a combination of rigidity enhancing features provided by the stepped sidewall component. First, the stepped sidewall component 30, which formed of bend (32, 36) in the sidewall and a generally horizontal rim segment 34, provides a rigid ring-like structure in the sidewall which imparts a stiffening circumferential component in a mid-section of the container (i.e., located between the bottom and the upper rim). In this manner, the sidewall undulation of bends of paperboard 30 and the rim 34 resist stress and/or strain when a downward force is applied to the upper surface of the container, thus reducing deflection of the container caused by such force. Further, the resistance from deformation of the container due to the bends of paperboard and the rim located in the lower sidewall reduces the stress and strain acting on other areas of the container, such as the tapered upper sidewall and the rim, areas vulnerable to buckling and/or pleat separation.

Secondly, the stepped configuration of the lower sidewall 16 forms a generally conical shape that resists localized bending of the sidewall when the container is held by a user's hand, while still allowing for a smooth tapered upper sidewall. Prior to the present invention, paperboard containers such as disposable paper plates, were designed to have a "smooth" conical shape throughout the height of the sidewall, between the bottom of the sidewall (at the bottom radius bordering the plate bottom) and the top of the sidewall (at the transition to the upper rim). Such smooth sidewall construction is common to allow for an overall conical shape of a container and to allow for, and not disrupt, pleat formation in the sidewall region. Further, it is understood that users of such products prefer and/or have become accustomed to having a smooth sidewall, such as with traditional non-disposable serving ware. A product made in accordance with the present disclosure provides rigidity enhancing features of a stepped lower sidewall comprised of a concentric ring structure 30 formed of bends of paperboard in the lower sidewall where pleat formation is minimal while also transitioning to a smooth tapered upper portion of the sidewall where pleat formation is most prevalent due to forming depth of the container geometric shape. Further, the stepped configuration 30 in the lower sidewall may be formed as relatively sharp bends of paperboard, thereby serving as a structural components that effectively lock the three-dimensional shape of the container to thus increase its rigidity. For example, in an embodiment of a paper plate with a characteristic diameter of approximately 8.5 inches, and overall height of approximately 0.75 inches, the stepped sidewall 30 may be formed by creating a first (lower) bend 32 of paperboard has a convex upper surface of paperboard formed with an inner radius of approximately 0.07 inch, and a second (upper) bend 36 of paperboard with a concave upper surface formed with a radius of approximately 0.03 inch. Similar relatively sharp bends of paperboard may be used when forming a larger paperboard container, such as a paper plate with a characteristic diameter of approximately 10.0 inches and an overall height greater than approximately 0.90 inches. Such a stepped sidewall configuration of sharp radii in the paperboard in the sidewall 16, particularly in the lower ⅓ portion of the sidewall 16, provides structural features that resist deformation of the container due to forces applied on the container 10. And the outwardly extending transition segment 34 of the stepped sidewall provides a circumferential rim structure extending outwardly, which also serves as a structural feature resisting deformation of the container.

In addition, forming undulating bends of paperboard into a stepped configuration at the lower portion of the sidewall immediately adjacent the bottom radius to effectively expand the location of the transition between the bottom wall 12 and the sidewall 16, resulting in an additional area for the user to place food while maintaining a suitable sidewall angle and reducing the extent of outwardly tapered smooth sidewall needed to form the three-dimensional shape of the container. In the embodiment shown in the Figures, the first bend 32 (the lower radius forming the stepped area 30 of the sidewall) is immediately above the bottom radius 14 of the container 10. For example, in an embodiment of a paper plate with a characteristic diameter of approximately 8.5 inches, and overall height of approximately 0.75 inches, the stepped sidewall configuration 30 terminates at the upper bend 36, which then transitions to a smooth outwardly tapered upper sidewall. In an embodiment such as shown in the Figures (FIGS. 10, 11), the lower bend 32 extends from the bottom radius 14 toward the second (upper) bend 36, such that the concentric ring structure 30 is located in the lower half of the sidewall height and at least the upper half of the sidewall is smooth and outwardly tapered. Therefore, a container may be constructed having desired depth and overall conical shaped sidewall wherein only an upper portion of the sidewall has a smooth tapered configuration.

While the specific embodiments have been illustrated and described, numerous modifications come to mind without significantly departing from the spirit of the invention, and the scope of protection is only limited by the scope of the accompanying Claims.

What is claimed is:

1. A disposable container constructed of paperboard formed into a geometric shape, the container comprising a bottom wall joined to an upwardly extending sidewall leading to an outwardly extending upper rim, said bottom wall having a central portion and an outer peripheral area bordered by a bottom radius formed as a curved bottom transition segment joining the bottom wall to the sidewall, wherein said sidewall has a sidewall height between said curved bottom radius and said outwardly directed upper rim the container; wherein an upper portion of the sidewall has a generally smooth tapered configuration that extends upward and outwardly, and a lower portion of the sidewall has a stepped configuration immediately adjacent and extending from said curved bottom transition segment, said stepped configuration comprising a lower bend directing the paperboard to join the curved bottom transition segment to an outwardly extending rim segment, and said rim segment is joined with an upper bend directing the paperboard generally upward from said outwardly extending rim segment to said upper portion of the sidewall, wherein said lower bend has an inner convex surface and said upper bend has an inner concave surface and said outwardly extending rim segment has a flat upper surface.

2. The disposable paperboard container of claim 1, wherein the entirety of said stepped configuration resides within a lower half of said sidewall height.

3. The disposable paperboard container of claim 1, wherein said outwardly extending rim segment resides within a lower quarter of said sidewall height.

4. The disposable paperboard container of claim 1, wherein said stepped configuration is positioned immediately adjacent said bottom radius to form an expanded bottom area located radially outward from the bottom wall.

5. The disposable paperboard container of claim 1, wherein the bottom wall has a central portion having a generally domed shape such that a central portion of the bottom wall resides at a height above the outer peripheral area of the bottom wall.

6. The disposable paperboard container of claim 1, wherein said outwardly extending rim segment of the stepped configuration has a radial span that is approximately 0.04 inches.

7. The disposable paperboard container of claim 1, wherein said geometric shape of the container comprises a paper plate with a substantially round outer periphery.

8. The disposable paperboard container of claim 1, wherein said geometric shape of the container comprises a paperboard platter with an elongated outer peripheral shape.

9. The disposable paperboard container of claim 1, wherein said geometric shape of the container comprises a outer peripheral shape having elongated sides.

10. A disposable container constructed of paperboard that is formed into a geometric shape having a bottom wall having a central portion and an outer peripheral area bordered by a bottom radius joining the bottom wall to an upstanding sidewall that extends radially outward and upward to an upper rim portion extending radially outwardly from the top of the sidewall, wherein said sidewall has a sidewall height comprised of a lower sidewall portion adjacent the bottom wall and an upper sidewall portion adjacent said upper rim portion, comprising;

an undulation of paperboard formed about a circumference of the sidewall immediately adjacent said bottom radius and said undulation resides within the lower portion of the sidewall, said undulation having a first curved segment extending from the bottom radius to an outwardly extending transition segment and a second curved segment extending upwardly to join the transition segment to said upper portion of the sidewall, wherein said outwardly extending transition segment has a flat upper surface.

11. The disposable container of claim 10, wherein said outwardly extending transition segment has a radial span of about 0.04 inch.

12. The disposable container of claim 10, wherein said first curved portion is an outwardly directed bend of the paperboard extending from said bottom radius, wherein said undulation is positioned immediately adjacent the bottom radius to form an expanded bottom area positioned radially outward of the bottom wall.

13. The disposable container of claim 10, wherein the entirety of the sidewall undulation resides in the lower half of the height of the sidewall.

14. The disposable container of claim 10, wherein the outwardly extending transition segment resides in the bottom quarter of the height of the sidewall.

15. The disposable container of claim 10 wherein said geometric shape of the container comprises a paper plate with a substantially round outer periphery.

16. The disposable container of claim 10 wherein said geometric shape of the container comprises a paperboard platter with an elongated outer peripheral shape.

17. The disposable container of claim 10 wherein said geometric shape of the container comprises a peripheral shape having elongated sides.

18. The disposable container of claim 10, wherein said outwardly extending transition segment comprises a rim with an upper surface having a radial span of about 0.04 inches.

19. A method of manufacturing a disposable paperboard container comprising the steps of:

providing a paperboard blank with an outer peripheral dimension;

applying pressure to said blank between forming dies having mating projections and recesses to form a geometric shape of a container having a bottom wall and a peripheral bottom radius, wherein said peripheral bottom radius joins the bottom wall to a sidewall portion that extends upwardly to an outwardly extending rim;

wherein said method of forming a geometric shape of the container comprises the step of applying pressure to the paperboard between forming dies having a mating projection and recess to form a stepped configuration of the paperboard within the sidewall, said stepped configuration of paperboard comprising a first bend of paperboard joining said peripheral bottom radius to an outwardly extending transition segment which leads to a second bend of paperboard joining the stepped configuration to a smooth portion of the sidewall, and wherein said outwardly extending transition segment comprises a substantially flat upper surface.

20. The method of claim 19 wherein forming a stepped configuration of paperboard in the sidewall comprises applying pressure to said paperboard between forming dies to form an undulation of the paperboard within a lower half of an overall height of the sidewall.

21. The method of claim 19 wherein forming the stepped configuration of paperboard in the sidewall comprises forming said outwardly extending transition segment with a substantially flat upper surface having a radial span of about 0.04 inch.

22. The method of claim 19 wherein said stepped configuration of paperboard is formed in the sidewall about the entire circumference of the sidewall.

23. The method of claim 19 wherein said stepped configuration of paperboard is formed within a lower half of the sidewall immediately adjacent the bottom radius to form an expanded bottom area positioned radially outward of the bottom wall.

* * * * *